Patented Apr. 8, 1924.

1,489,360

UNITED STATES PATENT OFFICE.

ARTHUR J. MOXHAM, OF ODESSA, DELAWARE, ASSIGNOR, BY MESNE ASSIGNMENTS, TO J. P. LAFFEY, TRUSTEE, OF WILMINGTON, DELAWARE.

PROCESS OF MANUFACTURING IRON AND STEEL DIRECT FROM THE ORE.

No Drawing. Application filed June 7, 1919, Serial No. 302,523. Renewed April 11, 1923.

*To all whom it may concern:*

Be it known that I, ARTHUR J. MOXHAM, a subject of the King of Great Britain, residing at Odessa, county of New Castle, and State of Delaware, have invented a new and useful Improvement in Processes of Manufacturing Iron and Steel Direct from the Ore, of which the following is a full, clear, and exact description, reference being had to the accompanying drawings, which form a part of this specification.

The object of my invention is to so recover the iron from an iron ore that it can be directly treated in an open hearth, or an electric furnace for the manufacture of steel or other ferro-alloy.

I first treat the ore with a sufficient quantity of acid to dissolve the metallic ingredients of the ore. Much of the economy depends upon the proper selection of the most suitable acid. Some acids will dissolve the iron ore more quickly and perfectly than others. Preferably, in dissolving iron ore, I use hydrochloric acid, which dissolves out the metal with great efficiency and speed and with a clean product resulting. As an alternative, sulfuric acid may be used.

After the ore is dissolved, I first separate the metallic contents, now in solution, from the insoluble gangue by draining off the solution. The solution made is one that is soluble in water, and, in the case of an iron ore, preferably iron chloride or iron sulfate.

The next step is the removal, from the residue, of the adherent liquid. Any liquid in contact with a solid adheres so tenaciously to the solid that even by long continued draining it cannot be removed very thoroughly. There will be as much as from 8 to 10 per cent adhering after many hours draining; and even after passing through an effective centrifuge, the amount of solution adhering cannot be reduced to much, if any, below 4 per cent. I prefer to remove the adherent solution by replacement with some cheaper liquid, preferably water, in which the solution is soluble. Replacement or dilution is resorted to, preferably while agitating either the ore or the water, or both. By this means the iron solution held by the residue is largely washed off, while the amount remaining is so diluted by its replacement with the water that the loss or waste is reduced to only a few pounds per ton of residue. The amount, and therefore cost, of this waste of solution determines largely how low a grade of ore can be worked, because the amount of the solution carried out with the insoluble residue and wasted is a more or less constant factor of the volume of the gangue and the gangue increases in relative quantity as the ore becomes lower in metallic contents.

When using hydrochloric acid, as outlined, to dissolve the iron, a still greater economy can be effected if desired by first treating the residue with concentrated sulfuric acid. This will drive off the hydrochloric acid in the solution still adhering to the residue, and the hydrochloric acid, set free as a gas, can be absorbed in water or other material and so reclaimed for future use. The iron present will be converted into ferric sulfate, which is also soluble in water; and the residue, coated with ferric sulfate, may be washed with water as before described.

In this case, while the amount of material left on the residue is no greater than when the chloride is treated directly, it now consists of sulfate of iron, which is of lower value than the chloride of iron, and so the cost of the material thus lost is reduced.

The solution of either the chloride or sulfate which is thus diluted by water is saved and the metallic ingredients therein can be reclaimed by using this water to absorb the gaseous hydrochloric acid when this acid is reclaimed as described hereinafter.

Furthermore, in some other methods of concentration, for example, by heavy specific gravity liquids, the loss from adhesion of the liquid to the material is applicable to both the concentrates and the tailings. As in this method the concentrates go into solution, this loss is limited to the tailings only, and therefore will be only from one-third to one-half of the loss in the other case.

The next step is to reclaim or win back, for further use, the acid used to dissolve the metallic contents of the ore. This can be done by the use of a stronger acid, which will drive off and replace the first acid used for this purpose. Assuming that the solution is ferric chloride, I gradually add concentrated sulfuric acid in such quantities that the hydrochloric acid is entirely driven off. The iron chloride is thus converted into an iron sulfate. The gaseous hydrochloric acid driven off may be reclaimed for further use, and the remaining iron sulfate is dissolved in water. While the hydrochloric acid may be reclaimed by being absorbed in water, the most economical procedure is to pass the same through a quantity of iron chloride that has not yet been treated with sulfuric acid and to which has been added some additional iron ore and allowing the ore and solution to absorb the acid as it is driven off. This is a valuable step in the process, inasmuch as the less water there is in the solution the less it is necessary to drive off in winning back the ammonium sulfate that is formed in the step of the process next to be described. As the metallic ingredients are in solution, it is feasible to further purify the solution by precipitation.

To the solution of iron sulfate, ammonia is added to the point of neutralization of the acid. The iron, thereupon is converted into a hydrated ferric oxide, which is precipitated. There will also be precipitated certain other ingredients that will vary somewhat according to the nature of the ore. As a general thing any alumina, manganese or phosphorous compounds will also precipitate as a hydrated oxide. But these precipitates can be completely separated from the iron in the subsequent heat treatment in the electric furnace described later.

After the precipitates have been separated from the remaining solution it consists of ammonium sulfate. A certain proportion of this solution adheres to the precipitated ferric oxid. The precipitate is washed with water in the ordinary manner to save all of the containing solution that may be in contact therewith. After standing, the precipitate settles solidly to the bottom of the vessel, and the liquid remaining, which may be called "wash water," is decanted off carefully and the remaining more or less damp mass should be filtered. This wash water may be utilized to dissolve fresh quantities of iron sulfate preparatory to the ammonia treatment; or it may be used for absorbing the hydrochloric acid which is driven off when sulfuric acid is added to the solution of iron chloride, as hereinbefore described, either or both. This treatment will extract and save the adherent solution. The solution of ammonium sulfate is reclaimed in crystal form by evaporating off the excess water. This crystallized ammonium sulfate is marketable as a fertilizer.

It usually requires a relatively considerable weight of acid to dissolve the metallic contents of the ore. Failure to win back the value of these materials would, in most cases, make the cost prohibitive and would, therefore, much limit the scope of the process. In my process, however, the materials used are not lost, but are reclaimed for use over again, thereby securing the utmost economy.

It will be understood that if the metal of the ore is originally dissolved by means of sulfuric acid, the process will be simplified, so far as the number of steps is concerned. When sulfuric acid is used the iron oxide of the ore becomes converted to ferric sulphate and if crystallized may become adherent to and mixed with the insoluble gangue. Being soluble in water, it can be separated from this gangue by the addition of either fresh water or of the wash water previously used in any of the washing processes. After the iron solution is thus obtained the base, for example, ammonia, will be added direct to this iron solution; but this procedure has some disadvantages because of the relatively slow and somewhat less efficient action of the sulfuric acid in dissolving the metal out of the ore.

The process may also be simplified by adding the base (either ammonia or lime) to the iron chloride without addition of the sulfuric acid, forming ammonium or calcium chloride, both of which are salable. In this case, the addition of more hydrochloric acid would be required.

As the chlorides are of greater market value generally than the sulfates, and as the relative prices frequently change, it will sometimes be more profitable to buy additional hydrochloric acid and sell the resulting chloride instead of reclaiming the acid and using it over again. At other times it will be more profitable to reclaim the hydrochloric acid and sell the sulfate. As either can be done, the process at this stage will be governed largely by market conditions. Moreover, as the tonnage of manufactured iron and steel far exceeds the fertilizer tonnage and that of the other possible by-products, the amount of steel that may be profitably made by my process will be influenced, if not limited, by the extent to which the by-products may be sold. Hence, it may be of great advantage to increase the number of these by-products, in the way I have indicated.

To the hydrated ferric oxide now obtained is added the necessary carbon to either reduce it to pure iron, or to get, as a resulting product, steel, and the mixture is then melted in an electric furnace. The carbon can be obtained by the distillation of any of the mineral oils, free from sulphur, e. g. the Pennsylvania oils, by the purification of the proper grade of coal by means of the haloid, or other appropriate process, or by any other customary means. At this stage those impurities which have been left in because they will not combine or interfere with that quality of the steel, for example, the hydrated oxide of alumina, or the phosphorous and manganese will be eliminated by the addition of necessary fluxing ingredients according to the usual methods. If some alloy other than steel be desired, I further treat iron, obtained as above, with the necessary ingredient to secure the desired alloy, adding it to the charge either before or during the melting, or in the ladle, according to customary practice. The product, when melted, is cast into ingot molds and then rolled or forged to the desired shape or size by the ordinary methods.

Having now fully described my invention, what I claim and desire to protect by Letters Patent is:

1. The process of extracting iron from its ores, which comprises so treating the ore that the iron will be obtained in the form of an iron salt in solution, and adding to the solution a base with greater affinity for the acid of the salt than has the iron, thereby forming a recoverable and valuable salt of said base and precipitating the iron as an hydroxide.

2. The process of extracting iron from its ores which comprises treating the ore with an acid to dissolve the iron, treating the resultant salt with another acid adapted to drive off and thereby render recoverable the first acid in a condition for reuse and combine with the iron to form a new salt, and adding to the second salt a base adapted to combine with the acid of the second salt, thereby forming a recoverable and valuable salt of said base and an hydroxide of the iron.

3. The process of extracting iron from its ores which comprises treating the ore with an acid to dissolve the iron, draining off the solution, recovering the solution adhering to the residue, treating the drained off and recovered solution with another acid adapted to drive off and thereby render recoverable the first acid in a condition for reuse and combine with the iron to form a new salt, and adding to the new salt a base adapted to combine with the acid of such salt, thereby forming a recoverable and valuable salt of said base and an hydroxide of the iron.

4. The process of extracting iron from its ores which comprises treating the ore with an acid to dissolve the iron, draining off the solution, treating with another acid the drained off solution and also the solution which has adhered to the residue after draining, the second acid being one adapted to drive off and thereby render recoverable the first acid in a condition for reuse and combine with the iron to form a new salt, adding to the new salt a base adapted to combine with the acid of such salt, thereby forming a recoverable and valuable salt of said base and an hydroxide of the iron, and subjecting the iron hydroxide to treatment required to convert it into a commercial product.

5. The process of extracting iron from its ores which comprises treating the ore with an acid to dissolve the iron, treating the resultant solution with another acid adapted to drive off and thereby render recoverable the first acid in a condition for reuse and combine with the iron to form as a precipitate a new iron salt, adding water to said salt to form a solution, adding to the last named solution a base adapted to combine with the acid of such solution, thereby forming a recoverable and valuable salt of said base and an hydroxide of the iron, and subjecting the iron oxide to treatment required to convert it into a commercial product.

6. The process of extracting iron from its ores which comprises treating the ore with an acid to dissolve the iron, treating the resultant solution with another acid adapted to drive off and thereby render recoverable the first acid in a condition for reuse and combine with the iron to form a new iron compound, treating the compound to form an iron hydroxide, washing the acid-treated residue of the ore with water, and utilizing the resultant weak acid solution to absorb the first acid driven off as above specified.

7. The process of extracting iron from its ores, which comprises so treating the ore that the iron will be obtained in the form of an iron salt in solution, adding to the solution a base with greater affinity for the acid of the salt than has the iron, thereby forming a recoverable and valuable salt of said base and precipitating the iron as an hydroxide, washing the precipitated iron hydroxide with water, and utilizing the wash water in the preparation of fresh quantities of the first named iron salt.

8. The process of extracting iron from its ores which comprises treating the ore with an acid to dissolve the iron, treating the resultant solution with another acid adapted to drive off and thereby render recoverable the first acid in a condition for reuse and combine with the iron to form a new iron salt, adding water to said salt to form a solution, adding to the last named solution a base adapted to combine with the acid of such solution, thereby forming a recoverable and valuable salt of said base and an hydroxide of the iron, washing the iron hydroxide with water, and utilizing the wash water to form a solution of the iron salt that is precipitated as above specified.

9. In the process of extracting iron from its ores, the sub-process, which comprises treating the ore with an acid to dissolve the iron, thus forming an iron salt, treating the resultant solution with another acid adapted to drive off the first acid and combine with the iron to form a new iron salt and absorbing the gaseous acid thus driven off in the non-concentrated solution of the first mentioned iron salt to which has been added additional ore.

10. The process of extracting iron from its ores, which comprises so treating the ore that the iron will be obtained as a sulphate in solution, and adding to this solution a base with greater affinity for the acid of the sulphate than has the iron, thereby forming a recoverable and valuable salt of said base and precipitating the iron as an hydroxide.

11. The process of extracting iron from its ores, which comprises so treating the ore that the iron will be obtained in the form of an iron salt in solution, and adding to the solution ammonia to form a recoverable and valuable salt and precipitating the iron as an hydroxide.

In testimony of which invention, I have hereunto set my hand, at New York, N. Y., on this 5th day of June, 1919.

ARTHUR J. MOXHAM.